UNITED STATES PATENT OFFICE.

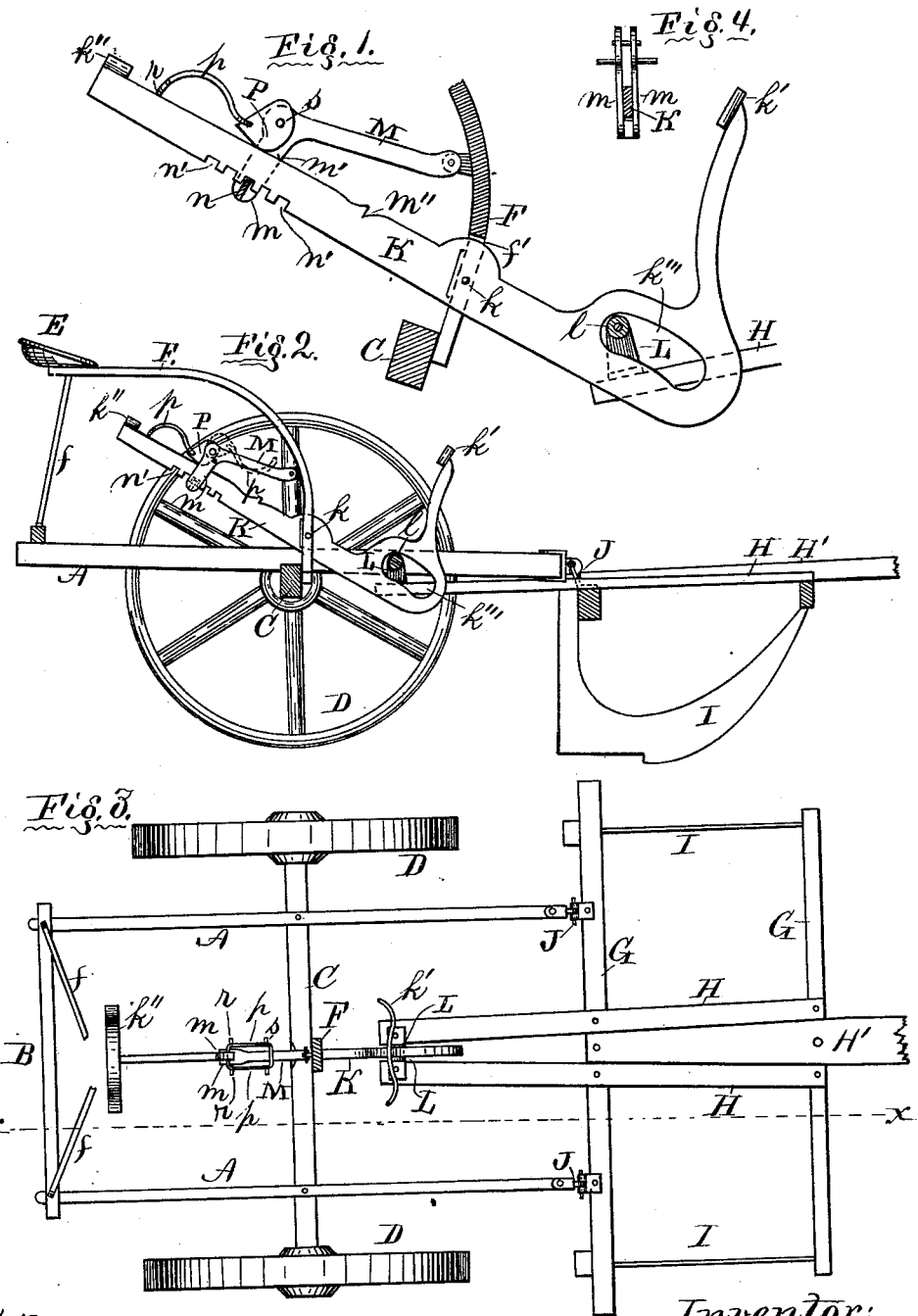

WILLIAM H. JOHNSON, OF MOLINE, ILLINOIS, ASSIGNOR TO DEERE & MANSUR COMPANY, OF SAME PLACE.

CORN-PLANTER.

SPECIFICATION forming part of Letters Patent No. 231,428, dated August 24, 1880.

Application filed July 6, 1880. (No model.)

*To all whom it may concern:*

Be it known that I, WILLIAM H. JOHNSON, a citizen of the United States, residing at Moline, in the county of Rock Island and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is an enlarged side elevation of the operating-lever and adjacent parts. Fig. 2 is a sectional elevation in the line $x\,x$ in Fig. 3. Fig. 3 is a top plan of a corn-planter frame, runners, and wheels embodying my invention, the seat-bar shown broken away. Fig. 4 is an enlarged rear elevation of the locking-pawl.

This invention relates to that class of corn-planters in which two frames are hinged together, the rear frame being mounted on wheels and supporting the driver's seat, and the forward frame supported on runners and carrying the seed measuring and dropping devices, and in which a lever is journaled to the rear frame and connected to the forward frame, so that the driver may operate it with his feet to raise and lower and depress the forward frame, and in which a hinged pawl is adapted to lock the lever and hold the forward frame in an elevated position; and the invention consists, first, in a hinged locking-pawl having a stirrup or downward projection on its rear end, with a pin or projection which may be made to engage with notches in the under side of the raising and depressing lever when the hinged pawl is raised, and thus lock and hold the forward frame down, so that the runners will cut into hard soil; second, in combination with the forward and rear frames of a corn-planter hinged to each other and provided with a raising and depressing lever and a locking-pawl, an eccentric adapted to engage the pawl when desired with the lever, and thus lock the frames together with the forward frame depressed, so as to force the runners into hard soil, and further adapted to be turned up, so as not to interfere with the operations of the lever in ordinary use.

Referring to the drawings by letters, letters A represent the side bars, B the transverse bar, and C the axle, constituting the rear frame, mounted on wheels D, and supporting a driver's seat, E, on a bar, F, which is attached to and curved upwardly and rearwardly from the axle and braced by bars $f\,f$. The forward frame is formed of transverse bars G G, and longitudinal central bars, H H, and draft-pole H', supported on runners I. These forward and rear frames may be of any ordinary construction, and hinged together at J, or in any other desired place. The bars H should however, preferably, extend rearward, as shown, for convenience of connection with the raising and depressing lever.

K is the raising and depressing lever, hinged at $k$, near its mid-length portion, in a slot, $f'$, in the seat-bar F, its forward end curved upwardly and rearwardly and provided with foot-plates $k'$, and its rear end provided with foot-plates $k''$, and its forward portion having a slot, $k'''$. L L are standards projecting upward from the rear ends of the bars H, and carry at their upper ends a short shaft, $l$, which extends through the slot $k'''$ in the lever K. M is a detent-pawl, hinged at its upper end to the rear side of the seat-bar F, and its rear end forked into branches $m$, and placed astride the rear part of the lever K, and provided with a catch, $m'$, which may be engaged with a notch, $m''$, in the upper side of the lever K, to hold the forward frame of the planter above the ground when raised by depressing the rear end of the lever K.

The construction, as hereinbefore described by letter, of the lever K and pawl M, and their arrangement and mode of operation, are substantially the same as shown in patent to James W. Atkinson, No. 225,318, and may be varied by the use of a raising and depressing lever of various forms, hinged to the rear frame and connected at its forward end with the forward frame, and a hinged pawl adapted to be moved at its free end to and from the rear end of the lever.

The ends $m$ of the pawl M extend below the lever K, and are connected by a stud or shaft, $n$. P is a cam pivoted eccentrically in the upper ends of the forks $m$ above the lever K, and provided with arms $p$, connected at their outer ends, and which may be thrown backward, as shown by full lines at Fig. 2, to draw the forks $m$ upward and engage the shaft $n$ with one of the series of notches $n'$ in the under side of the lever K, or thrown forward, as shown by dotted lines at same figure, to allow the rear end of the pawl M to lower and release the shaft or catch $n$ from the notch $n'$.

When the cam P is turned forward with its arms $p$ resting on the lever K, as shown by dotted lines at Fig. 2, the lever K may be raised and lowered freely without interruption by the catch $n$. When it is desired to lock the front and rear frames of the planter to each other, with the front frame depressed so as to force the runners into hard soil, or for other purposes, the forward end of the lever K may be forced downward as far as desired for the purpose, and then locked by turning the cam-arms $p$ backward, as shown by full lines at Fig. 2, to engage the catch $n$ with the adjacent notch $n'$ in the lever K.

Foot-plates $r$ project laterally from the arms $p$, by means of which they may be conveniently operated, and foot-plates $s$ extend laterally from the rear part of the pawl M, by means of which it may be operated when desired.

What I claim as new is—

1. In a corn-planter, the combination, with the forward and rear frames hinged or pivoted together, and with the notched depressing-lever and hinged pawl, of a cam, P, adapted to lock the pawl and lever, and thereby the hinged frames of the planter, substantially as and for the purpose herein described.

2. In combination with the forward and rear frames of a corn-planter hinged or pivoted together, and with the depressing-lever having notches $n'$, and pawl M, having catch $n$, the cam P, having arms $p$, adapted to be turned forward to release the catch $n$, and to be turned rearward to cause it to engage with one of the notches $n'$, substantially as and for the purpose specified.

3. The cam P, having arms $p$ and foot-plates $r$, in combination with the lever K, pawl M, and the forward and rear frames of a corn-planter hinged to each other, substantially as and for the purpose specified.

4. In a corn-planter, the combination, with the forward and rear frames hinged or pivoted together, and with the lever K, having a slotted forward part and upwardly and rearwardly bent forward end, and with the hinged pawl M, of the cam P, adapted to lock the lever K and pawl M to each other, whereby the runners may be forced into hard soil, substantially as described, and for the purpose specified.

5. In a corn-planter, the combination, with the forward and rear frames hinged or pivoted together, and with the depressing-lever and hinged pawl M, of a lock or stop adapted to lock the pawl and depressing-lever to each other, and thereby lock the frames of the planter to each other.

In testimony whereof I affix my signature in presence of two witnesses.

WILLIAM H. JOHNSON.

Witnesses:
THOMAS MCKEE,
P. R. RICHARDS.